(12) United States Patent
Maunsell

(10) Patent No.: US 6,244,277 B1
(45) Date of Patent: Jun. 12, 2001

(54) DISHWASHER

(75) Inventor: Steve Maunsell, Dunedin (NZ)

(73) Assignee: Fisher & Paykel Limited, Auckland (NZ)

( * ) Notice: Subject to any disclaimer, the term of this patent is extended or adjusted under 35 U.S.C. 154(b) by 0 days.

(21) Appl. No.: 09/663,980

(22) Filed: Sep. 19, 2000

Related U.S. Application Data

(62) Division of application No. 09/020,580, filed on Jan. 30, 1998.

(30) Foreign Application Priority Data

Jan. 30, 1997 (NZ) .......................................... 314155

(51) Int. Cl.⁷ .................................................. A47L 15/42
(52) U.S. Cl. .......................................................... 134/60
(58) Field of Search ............................... 134/56 D, 57 D, 134/58 D, 60, 88, 89, 90, 91; 68/902

(56) References Cited

U.S. PATENT DOCUMENTS

| | | | | |
|---|---|---|---|---|
| 1,162,966 | * | 12/1915 | Sargeant et al. | ........... 134/88 X |
| 1,397,846 | * | 11/1921 | Walker | ................ 134/60 |
| 3,288,154 | * | 11/1966 | Jacobs | ............ 134/60 X |
| 5,755,244 | * | 5/1998 | Sargeant et al. | ............ 134/88 |

FOREIGN PATENT DOCUMENTS

WO9312706    7/1993   (WO) .

\* cited by examiner

Primary Examiner—Philip R. Coe
(74) Attorney, Agent, or Firm—Trexler, Bushnell, Giangiorgi, Blackstone & Marr, Ltd.

(57) ABSTRACT

A dishwasher having a cabinet and wash chambers is the form of drawers which slide in and out of the cabinet. Rigid and flexible closures are disclosed for sealing off the wash chambers when retracted into the cabinet. A detergent dispenser for the dishwasher is provided in one wall of a wash chamber in the wash water discharge path into the wash chamber so that detergent powder is flushed out of the dispenser and mixed with the wash water prior to the latter being discharged into the wash chamber.

A wash programme for a dual wash chamber dishwasher is also disclosed which minimizes total water consumption by transferring water from one chamber to the other.

1 Claim, 21 Drawing Sheets

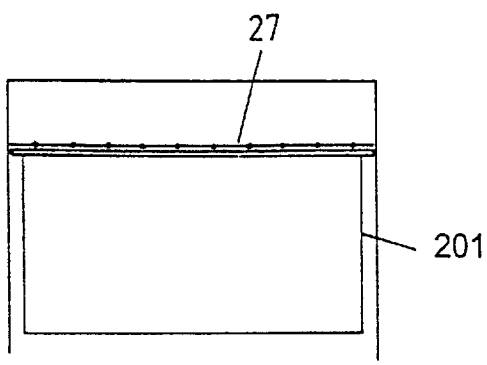
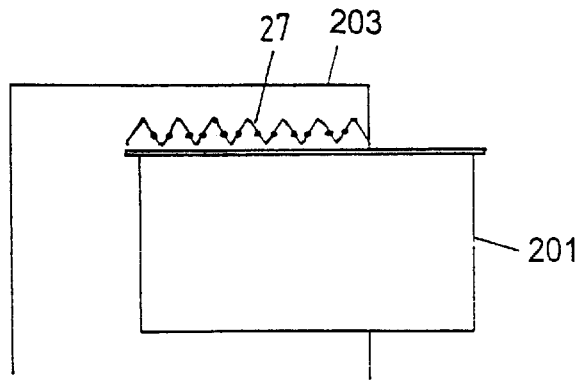
FIG. 16  FIG. 17
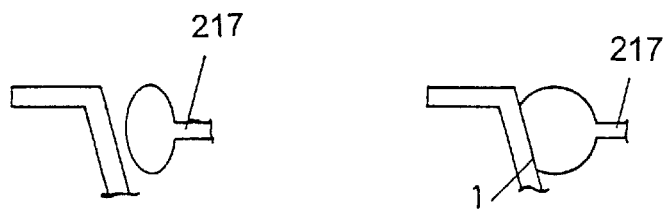
FIG. 18  FIG. 19

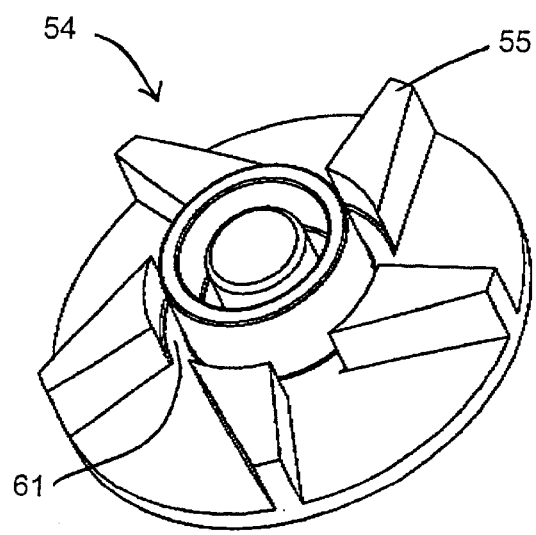
FIG. 26
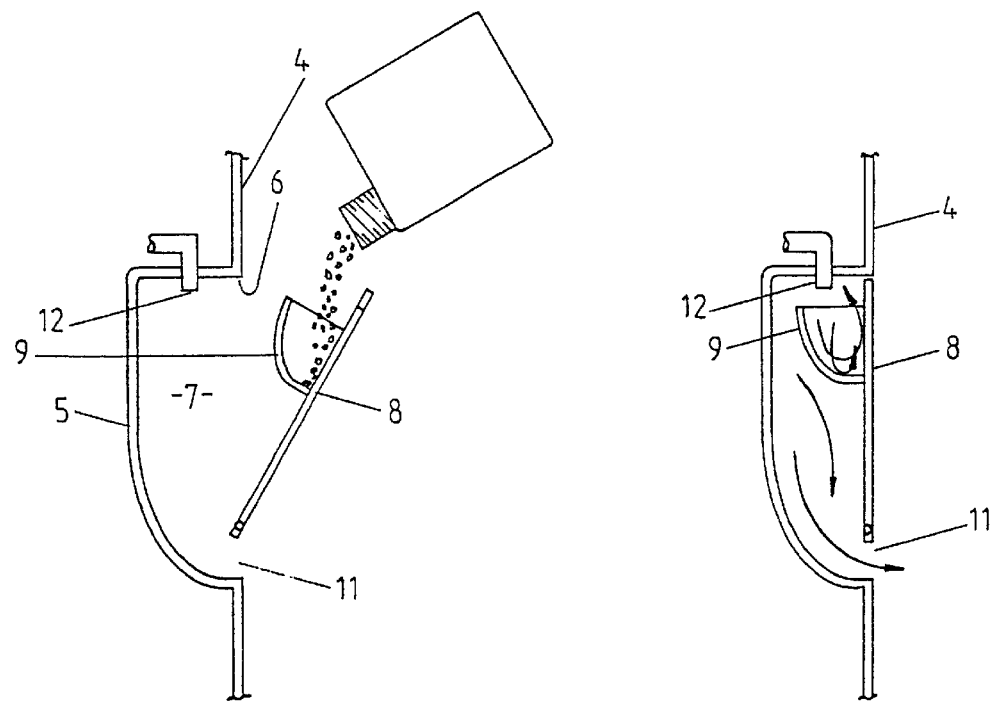
FIG. 30
FIG. 31

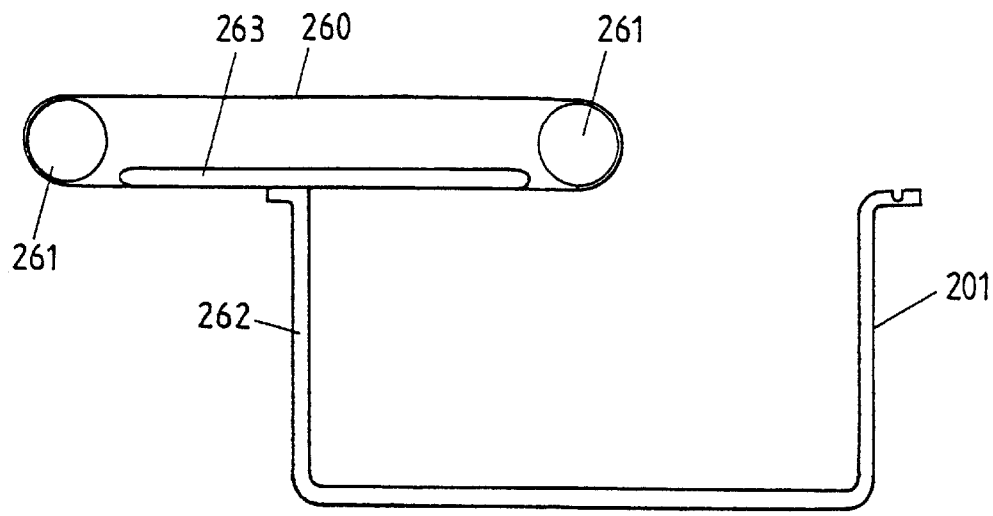
FIG. 42
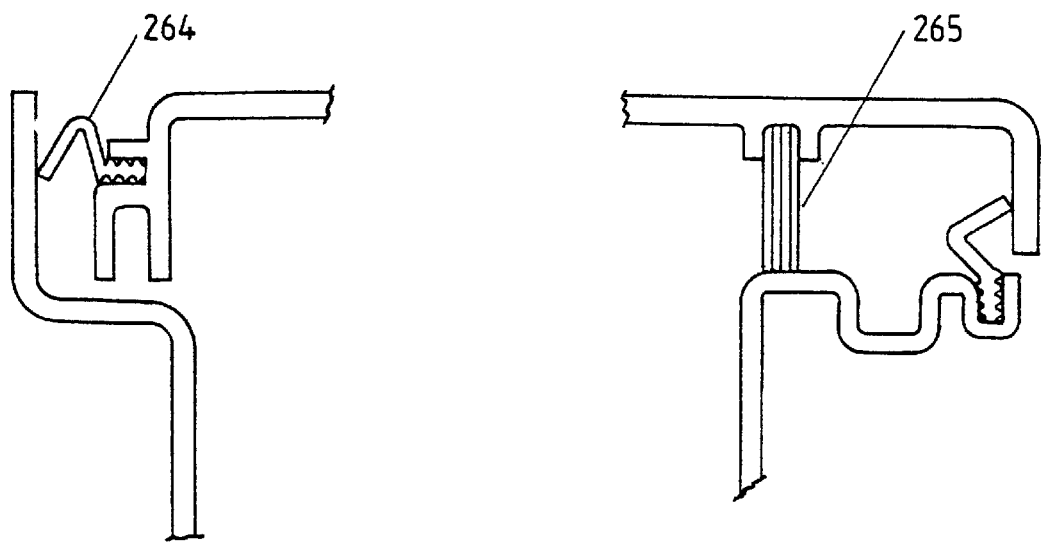
FIG. 43
FIG. 44

DISHWASHER

This is a divisional of copending application Ser. No. 09/020,580 filed Jan. 30, 1998.

FIELD OF THE INVENTION

This invention relates to dishwashers and in particular but not solely to a dishwasher of the type disclosed in the applicant's international patent specification WO 93/12706.

PRIOR ART

The dishwasher of WO 93/12706 has a form generally indicated in FIGS. 1 and 2 and installation options as shown in FIGS. 4 to 6. The dishwasher disclosed in WO 93/12706 differs from conventional dishwashers in that a wash chamber and associated wash system is slidably mounted in the form of a drawer within a cabinet and the chamber is withdrawn horizontally to allow loading through the open top of the chamber. When the chamber is retracted an associated lid sealably closes off the top of the chamber to contain wash liquid in operation. In WO 93/12706 the wash chamber lid is of unitary construction movably retained in the top of the cabinet and engaged by the wash chamber on retraction to move down onto the top of the wash chamber using a parallelogram linkage and cam mechanism. In practice it has been found that other types of wash chamber covers may be satisfactory and may have better production economics.

Detergent dispensers are a necessary component of all dishwashers. Conventional dispensers retain a charge of detergent until an appropriate point in the wash cycle, at which time a detergent receptacle opens to release detergent into the wash chamber. Conventional dispensers have the disadvantage that considerable quantities of high pressure liquid need to enter the detergent receptacle to ensure it is properly flushed and where the receptacle uses a moving door to release the detergent, the opening of the door can be obstructed by the wash load.

In the previously mentioned WO 93/12706 a dishwasher drain pump was disclosed. While the drain pump there described operated satisfactorily, particles in the soiled wash water could be deposited in the gap between the motor rotor and well 106.

In WO 93/12706 a dishwasher was disclosed having a cabinet containing single wash chamber and associated wash system. Because a sliding drawer type configuration exerts more forces on the cabinet than front loading machines portal frame members were proposed to increase the racking resistance of the cabinet. In WO 93/12706 it was envisaged that increased dishwashing capacity could be achieved by simply increasing the number of discrete dishwasher modules. Particular reference was made to mounting two modules under a kitchen bench one above the other. The height of each module was chosen to ensure that when two modules were mounted in the kitchen joinery one above they other they would fit within the bench height of typical household kitchens. In some circumstances an integral two wash tub dishwasher may be preferred—that is, a cabinet having two drawers instead of one. This however increases the problem of providing adequate resistance to racking forces exerted by the wash tabs since the 'open' fronted cabinet is then required to be approximately twice the height of a single drawer cabinet.

SUMMARY OF INVENTION

It is an object of the present invention to provide a dishwasher of the type described having an effective wash chamber closure sealing system.

It is a further object of the present invention to provide a dishwasher detergent dispenser which at least goes some way towards overcoming the above-mentioned disadvantages.

Further objects of the invention are to provide:
a dishwasher with an improved drain pump,
a dishwasher cabinet for housing two wash chambers,
a dishwasher water management system, and
a heating element fault protection circuit.

In one aspect the present invention consists in a washing appliance comprising:
 (a) a cabinet,
 (b) a wash system slidably mounted within said cabinet in such a manner that it may be withdrawn horizontally out of said cabinet for access thereto, said wash system including:
   (i) an open top wash chamber adapted to accommodate dishes within which wash liquid is circulated, said wash chamber having a top peripheral rim,
   (ii) means for introducing and circulating wash liquid within said chamber,
   (iii) means for evacuating wash liquid from said chamber,
 (c) a wash chamber closure mounted in the top of said cabinet, which closure covers the open top of said wash chamber on retraction of the wash chamber into said cabinet,
 (d) said closure having peripheral means which cooperate with said rim to prevent egress of wash liquid from the wash chamber when it is retracted into said cabinet, and said closure being retained in a substantially fixed vertical position in the top of said cabinet.

In a further aspect the invention consists in a washing appliance comprising:
 (a) a cabinet,
 (b) a wash system slidably mounted within said cabinet in such a manner that it may be withdrawn horizontally out of said cabinet for access thereto, said wash system including:
   (i) an open top wash chamber adapted to accommodate items to be washed and within which wash liquid is circulated, said wash chamber having a top peripheral rim,
   (ii) means for introducing and circulating wash liquid within said chamber,
   (iii) means for evacuating wash liquid from said chamber,
 (c) a wash chamber closure mounted in the top of said cabinet, which closure covers the open top of said wash chamber on retraction of the wash chamber into said cabinet,
 (d) said closure being mounted in the top of said cabinet by mechanical means which permit it to move in a vertical direction only and said closure having peripheral means which cooperate with said rim to prevent egress of wash liquid from the wash chamber when it is lowered from a raised position; and
 (e) means for raising said closure prior to withdrawal of the wash system from the cabinet and lowering said closure on retraction of said wash system into said cabinet.

In a further aspect the invention consists in a dishwasher, including a detergent dispenser mounted in one interior wall thereof and a controller which controls the sequence of operations executed by said dishwasher, said detergent dispenser comprising:

a receptacle located behind said wall and communicating with the dishwasher interior through a vent in said wall, an open top container for holding a charge of detergent mounted within said chamber, a water outlet nozzle positioned above the open top of said container, and a supply valve which supplies water to said nozzle, said controller causing said valve to open at a predetermined time in said cycle to cause water to be discharged from said nozzle into said container to mix with and flush said detergent charge through said vent into the interior of said dishwasher.

In yet a further aspect the present invention consists in a washing appliance according to claim 13 wherein said lid is mounted in the top of said cabinet so as to lower when the wash chamber is retracted and raise when the wash chamber is withdrawn, the edge of said lid is provided with downward facing, flanges and the rim of said wash chamber is provided with complementary upward facing flanges, the lid and rim flanges loosely inter-engaging when the lid is lowered to form a labyrinthic seal there between.

In yet a further aspect the present invention consists in a cabinet for a dishwasher having a box configuration with one open side and including a recessed kick plate along the bottom of the open side which cabinet provides resistance to racking forces applied parallel to the open side comprising:

a top, bottom, two side walls and a back wall of thin sheet material joined along their edges to leave a substantially rectangular front opening defined by the front edges of the top, bottom and two side walls, the front edge of the bottom wall and the lowermost portions of the side walls being co-planar and recessed back from the front edges of the top wall and the upper portions of the side walls which lie in a second plane, internally directed flanges on said front edges, said flanges on the bottom and bottom side contiguous edges being rigidly joined at the two bottom corners and thereby configured as an inverted tapered beam portal frame with said two corners forming moment resisting joints, rigid link members coupling the flanges on the lower recessed portions of the side walls to said flanges on the upper portions of the side walls and the flange on the top edge forming a beam linking the tops of the flanges on the upper portions of the side walls, the two joints defined by the intersections of the beam with the portal frame having no substantial resistance to bending moments.

In yet a further aspect the present invention consists in a dishwasher having a wash programme consisting of pre-rinse, wash, first post rinse and second post rinse cycles comprising:

to first and second wash chambers, means for transferring wash liquid from the first wash chamber to the second wash chamber, and a controller which implements said wash programme and which controls the operation of said transference means, said controller:

(a) delaying the commencement of the wash programme for said second wash chamber until after the end of the first post rinse cycle in the wash programme for the first wash chamber, (b) causing said transference means to transfer the rinse water from the first post rinse cycle of the first wash chamber from the first wash chamber to the second wash chamber, (c) initiating the pre-rinse cycle for the second wash chamber using the first post rinse water from the first wash chamber, (d) causing said transference means to transfer the rinse water from the second post rinse cycle of the first wash chamber from the first wash chamber to the second wash chamber, and (e) initiating the wash cycle for the second wash chamber using the second post rinse water from the first wash chamber.

In yet a further aspect the present invention consists in a dishwasher comprising:

(a) a wash chamber adapted to accommodate dishes within which wash liquid is circulated, (b) a cylindrical well provided in the floor of said chamber, (c) an electric motor including:
  (i) a rotor mounted within said well and
  (ii) a co-acting stator mounted outside said wash chamber about the exterior surface of said well such that the cylindrical sides of said well lie in the rotor-stator air gap, (d) a drain pump impeller mounted on the rotor drive shaft in the well below the rotor, (e) a sump formed in the floor of said wash chamber which is connected to the lower side wall of said well which houses said impeller by a conduit, (f) a discharge tube connected to a different point about the surface of the lower side wall of said well which houses said impeller, (g) said drain pump impeller comprising a disc, the periphery of which is closely adjacent to the side wall of said well to form a seal against fluid flow up the side of said well, said disc having a hub portion and blades formed on the lower surface thereof with the root of each blade radially spaced from the periphery of the hub portion to form an unimpeded annular fluid passage between the hub portion and the blades.

In yet a further aspect the present invention consists in a protection circuit for a resistive heating element powered from an alternating current supply comprising:

a current transformer the primary circuit of which comprises both the phase and neutral supply conductors connected across said heating element, a secondary transformer winding across which a voltage is developed which is proportional to any out of balance current between the phase and neutral conductors respectively, a third conductor forming a tertiary transformer circuit which is arranged to carry a very low bias current derived from said alternating current supply and to continuously develop a small predetermined voltage in the transformer secondary winding, a direct current supply derived from said alternating current supply, a relay coil and a transistor series connected across said direct current supply, the relay switch being connected in series with one of the alternating current supply conductors to the heating element, a voltage sensing means connected to said secondary winding which provided said predetermined voltage is present across the secondary winding supplies enough current to said transistor to cause it to conduct sufficiently to allow a current to flow through said relay coil from said direct current supply which is sufficient to hold the relay switch on and to present an alternating voltage across said heating element, but in the event of failure to detect said predetermined voltage said voltage sensing means supplies insufficient current to said transistor to allow it to conduct enough current through the relay coil to retain the relay latched on.

BRIEF DESCRIPTION OF THE DRAWINGS

FIGS. 16 and 17 show an alternative method of sealing an open topped wash chamber using a flexible closure, FIGS. 18 and 19 show diagrammatically a further method of sealing an open topped wash chamber with a rigid lid, FIG. 26 shows an isometric underside view of the drain pump impeller, FIG. 30 shows a dishwasher detergent dispenser open for filling, FIG. 31 shows the dishwasher detergent dispenser of FIG. 30 closed for use, FIG. 42 shows diagrammatically yet a further alternative closure system for a wash chamber using an endless belt, FIGS. 43 and 44 show supplementary sealing members for a wash chamber closure.

DETAILED DESCRIPTION OF THE PREFERRED EMBODIMENTS

Figure 1:
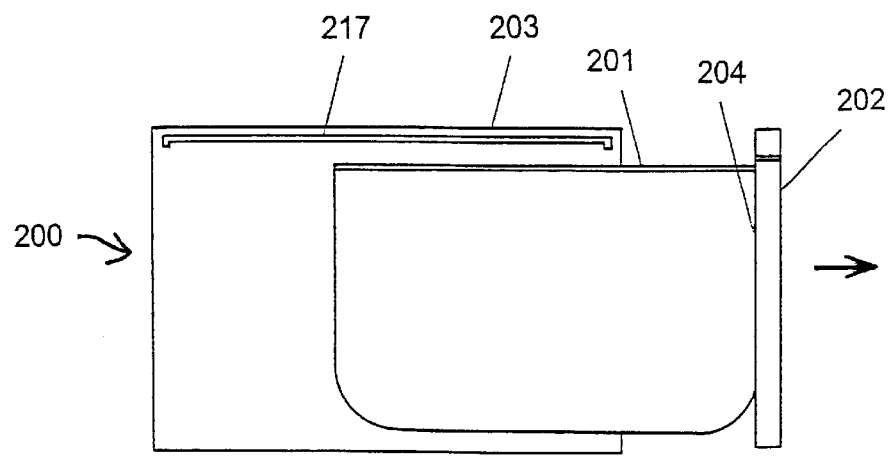
FIG. 1 shows in diagrammatic form a dishwasher of the present invention.
Figure 2:
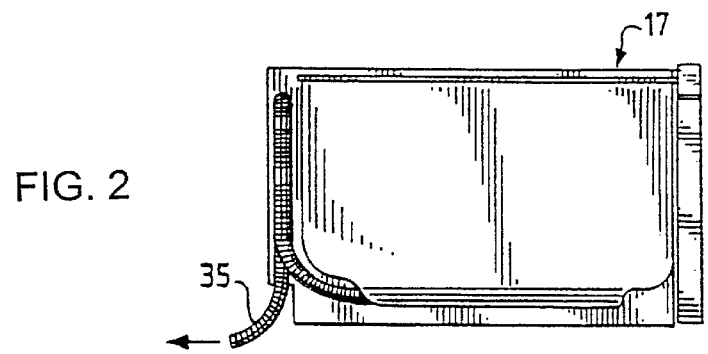
FIGS. 2 and 3 shows in diagrammatic form the dishwasher plumbing and wiring system with the wash chamber in the closed and open positions respectively.

The present dishwasher 200 is of the type illustrated in FIG. 1. A wash chamber 201 (with all wash system components) fitted with a front panel 202 is slidably mounted within a cabinet 203 in a 'drawer' arrangement. The wash chamber has an open top and is withdrawn from the cabinet in the direction of the arrow to allow loading and unloading of dishes and is retracted into cabinet 203 during washing. The wash and drain systems are fitted within wash chamber 201 including a motor and pumps. Flexible connecting wiring and plumbing 228 couple the wash chamber to the relevant terminations within the cabinet in the manner indicated in FIGS. 2 and 3. The dishwasher controller may be mounted in the cabinet or in the sliding wash system.

Figure 4:
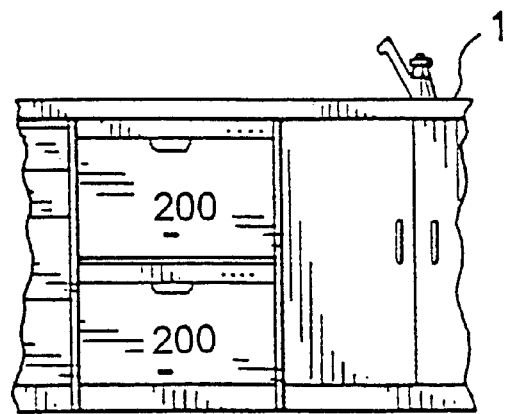
FIGS. 4 to 6 show a selection of ways in which dishwashers of the type in WO 93/12706 and in the present specification may be mounted in a modular fashion in a kitchen installation.
Figure 5:
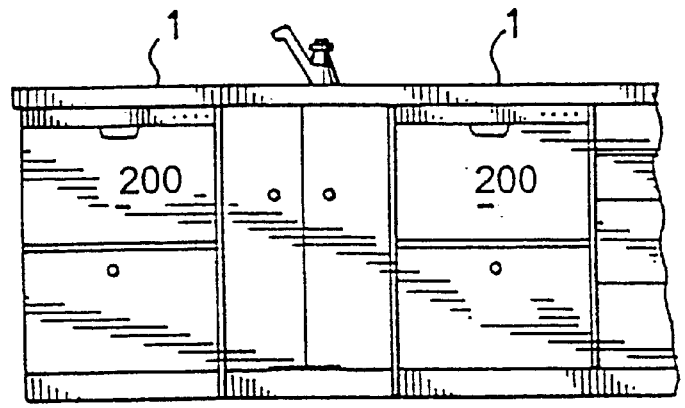
Figure 6:
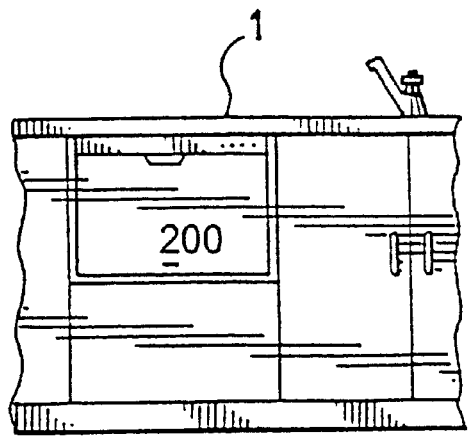

The dishwasher is usually constructed with a height dimension approximately half that of conventional front-loading domestic dishwashers. In this form it can be used alone or as one of a number, more usually one of a pair of such dishwashers. FIGS. 4 to 6 show installation concepts using one or two dishwashers using this modular concept. In FIG. 4, two such dishwashers 200 are shown stacked one above the other under a sink bench 1 which will typically be between 850 and 900 mm above floor level. In FIG. 5 two dishwashers 200 are shown mounted one on either side of a sink forming part of the sink bench 1. In FIG. 6 only a single dishwasher 200 is provided under a sink bench 1. Because of the reduced height dimension a dishwasher according to the invention could also be bench mounted.

From FIG. 4 it can be seen that when two modular dishwasher units 200 are stacked one above the other the configuration is similar in external dimensions to conventional dishwashers. Two modular units 200 installed side by side immediately under a bench top as in FIG. 5 offer the same capacity as a conventional dishwasher but avoid the inconvenience of a user having to bend down to reach the lower half of the dishwasher.

Figure 7:
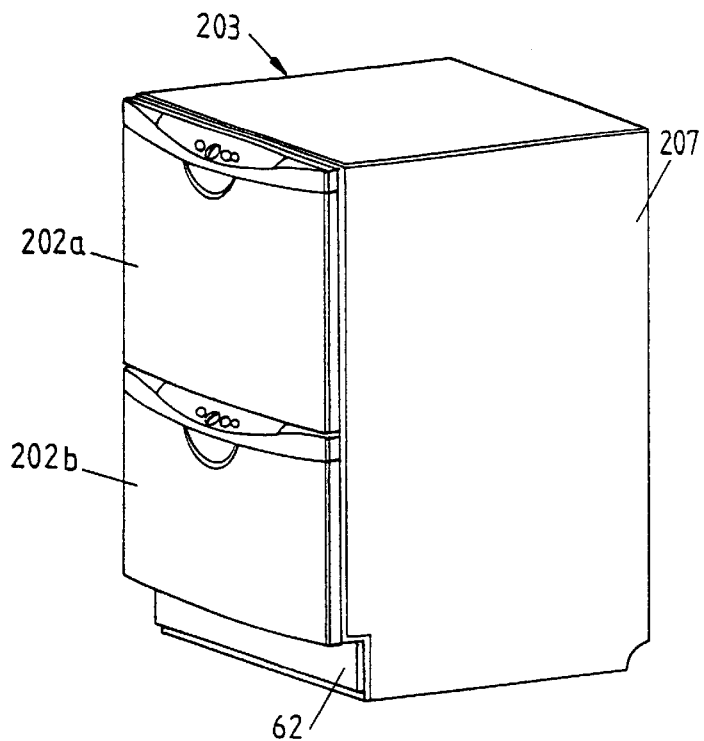
FIG. 7 shows a 'two drawer' single cabinet dishwasher according to the present invention.

Some pair arrangements could be manufactured as such rather than pairing two individual modules at installation. For example the two dishwasher 'over and under' configuration shown in FIG. 4 can be manufactured in a single external envelope or cabinet and provided for installation as a unitary machine. Such a two drawer machine is shown in FIG. 7, comprising a single cabinet 203 which houses two drawer type wash chambers 202a and 202b. The drawer fronts are each provided with an aesthetically pleasing facia.

A two drawer machine of this type allows for considerable flexibility in operating modes. These include:

1. One module operating, or two modules operating simultaneously with a mixed dish load. With each module capable of accommodating the largest item of dish load, this concept offers an increased capacity for large items.
2. One or both modules operating, but not necessarily simultaneously, where each module has either lightly soiled or heavily soiled dish load, and the appropriate wash programme set to suit the individual module.
3. One module being gradually filled with soiled dishes, while the second module is being emptied only as its clean dish load is being reused. For reasons of hygiene this is not practical with single dishwashers.
4. One module programmed for lightly soiled loads and the other module for heavily soiled loads.
5. One module switched on as soon as it has been filled with soiled dishes. That is, smaller loads may be efficiently washed.

Cabinet

Figure 8:
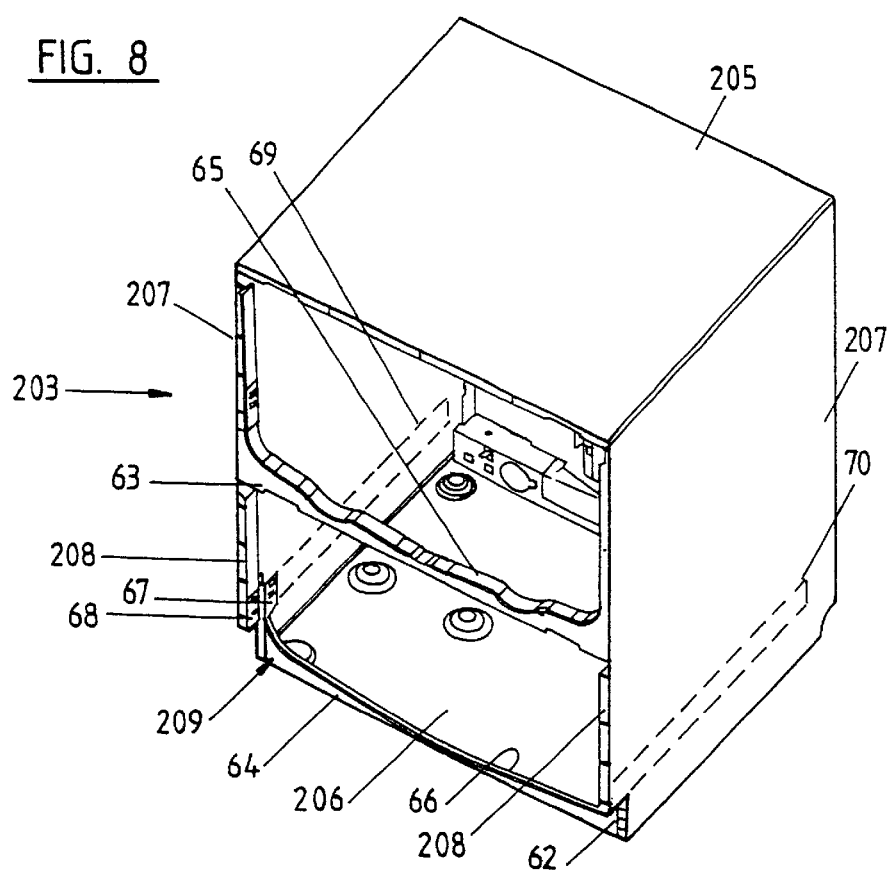
FIG. 8 shows the structural features of the cabinet of FIG. 7, FIGS. 9 and 10 show in diagrammatic form a means of sealing an open top wash chamber with a rigid lid using an inflatable gasket.

FIG. 8 shows some of the structural features of the cabinet 203 of FIG. 7. Cabinet 203, which would normally be made from sheet steel, has the form of an open-sided box with top and bottom panels 205 and 206, two side walls 207 and a rear wall (not shown). The front of the cabinet is open except for a shallow kick plate 62 which is recessed back from the principal plane of the front of the cabinet. The open front of cabinet 203 is stiffened to resist lateral racking forces by the provision of portal frame members 63 and 64 as described in WO 93/12706. The bottom of each of the two wash chambers 202a and 202b is configured to pass over the upper flanges 65 and 66 of portal frame members 63 and 64 respectively. However, unlike the portal frame for the upper opening (and unlike the cabinet shown in WO 93/1206) portal frame member 64 is offset rearwardly from the principal plane of the front of cabinet 61 and its effectiveness in resisting racking moments on the bottom half of cabinet 61 is reduced. This is overcome in the present invention by providing reinforcing plates 67 and 68 at the top of kick plate 62 and structurally tying these plates together through the lower wash chamber slide members (not shown) which are located in positions 69 and 70 indicated in broken lines. Plates 67 and 68, because of their rigidity and rigid connections to the bottom frame 64 and the side frames 208, respectively transfer racking forces applied to the side frames to the gusset areas 209 at each end of the bottom frame 64.

Closure for Sliding Drawer Wash System

In a washing machine as proposed here, where the wash chambers are mounted as sliding drawers, the closing of the chambers prior to commencement of the wash cycle is more complicated than with conventional front loading or above-bench top loading machines. It is undesirable to have users manually close a door to seal the open-topped wash chamber prior to pushing the extended 'drawer' back into the cabinet. It is preferable to have a closure which is actuated by the action of retracting the wash chamber back into the cabinet.

In FIG. 1, a rigid closure or lid 217 is diagrammatically shown which is mounted in the top of the cabinet 203 for closing the open top of wash chamber 201. Closure can be effected by mounting the lid in such a way as to allow it to be mechanically forced downwardly on to the rim of wash chamber as the chamber is retracted into cabinet 203. One means for achieving this type of sealing action is disclosed in WO 93/12706. In contrast to moving a rigid lid in both the horizontal and vertical directions by mechanical linkages in a parallelogram fashion to a sealing position during the last portion of travel of the wash chamber, the present invention provides alternative solutions.

Figure 9:
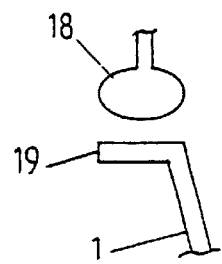
Figure 10:
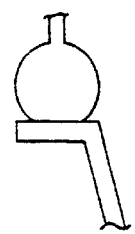
Figure 38:
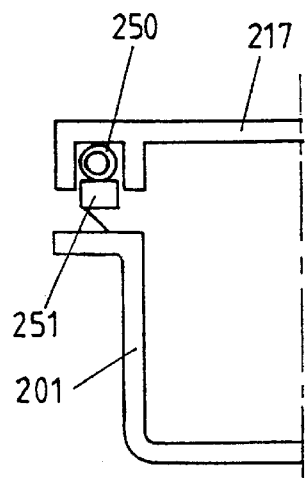
FIG. 38 shows a diagrammatic view of an alternative construction for closing a wash chamber when a fixed lid is used.

The first of these is illustrated diagrammatically in FIGS. 9 and 10. In this case a rigid lid 217 is used as previously described, but is fixed in position in the top of cabinet 203 and fitted with a peripheral inflatable gasket 18 located in vertical registration with rim 19 of wash chamber 201. In this embodiment when the wash chamber is fully retracted, member 18 is inflated as shown in FIG. 10 to sealably engage with rim 19. In this case member 18 is the sealing member, but an equally suitable alternative would be to inflate a sealing member carrier 250 interposed between the lid and sealing member 251 as shown in FIG. 38.

Figure 11:
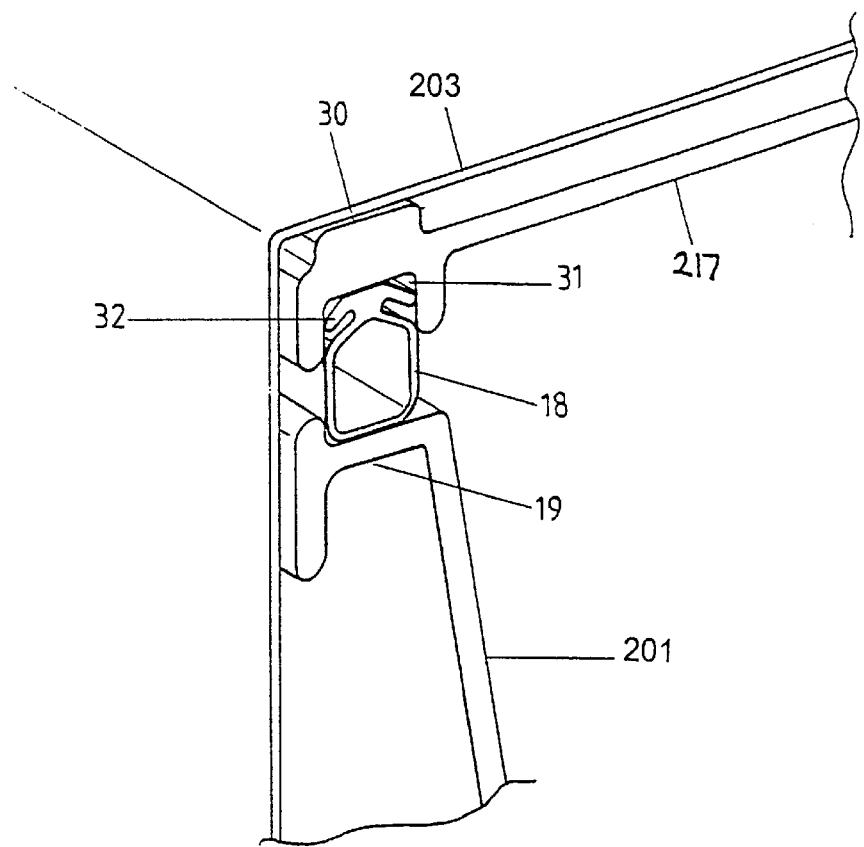
FIG. 11 shows a partial section through a dishwasher incorporating the sealing method shown in FIGS. 9 and 10.
Figure 13:
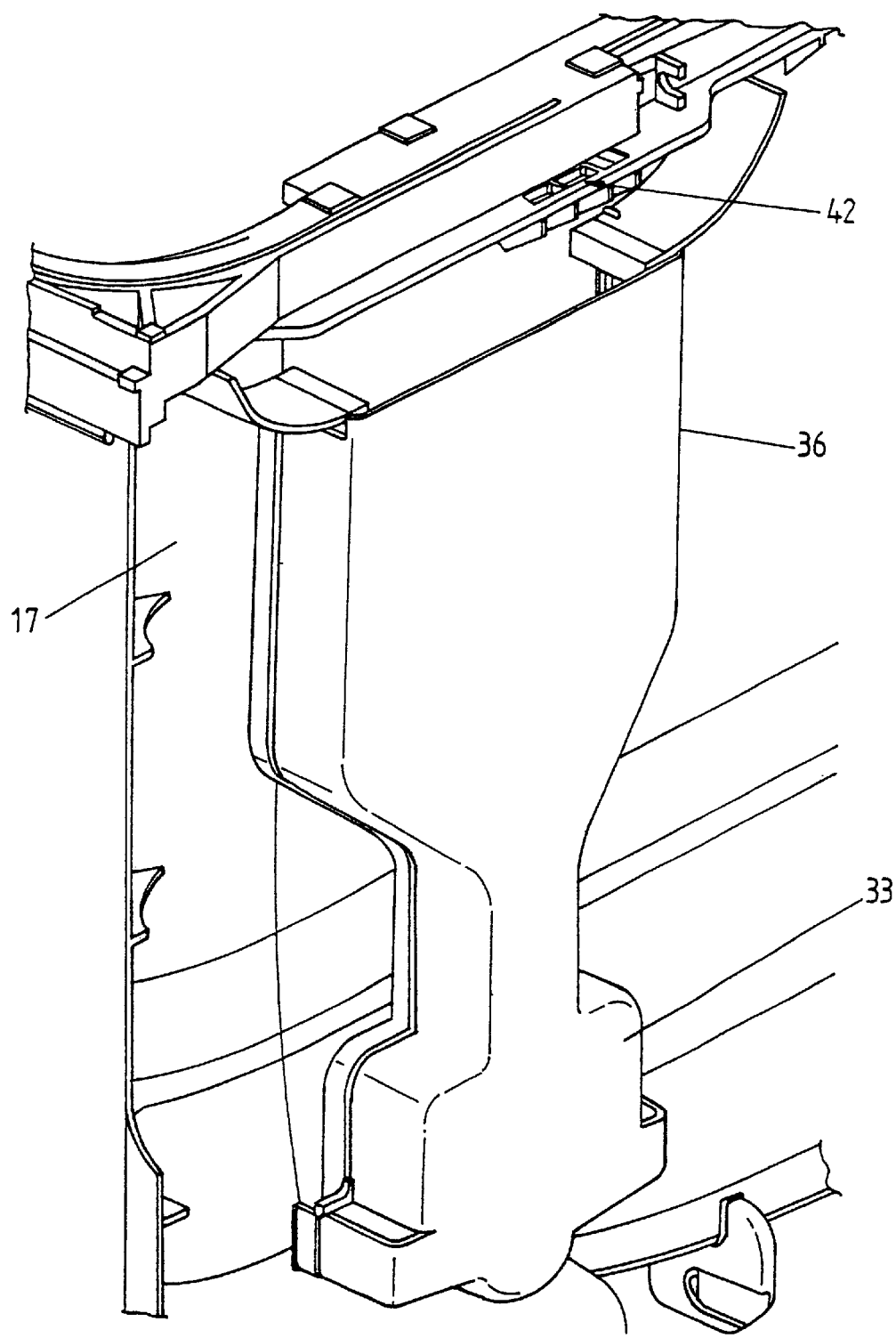
FIG. 13 shows a partial isometric drawing of a dishwasher wash chamber with lid and a sealing gasket as shown in FIG. 11.

A practical realization of this embodiment is shown in more detail in FIGS. 11 and 13. Wash chamber 201 is formed with a flanged rim 19 which in use provides a seat for inflatable gasket 18. In FIG. 11 wash tub 201 is indicated as being fully retracted within cabinet 3 with gasket 18 being inflated so as to sealably engage rim 19.

A rigid lid 217 is fitted into the top of cabinet 203 and a peripheral abutment 30 on lid 217 bears against the underside of the top of cabinet 3. Lid 217 is essentially fixed in relation to cabinet 203. It is provided at the periphery of its underside with a channel 31 for retaining gasket 18.

Gasket 18 is moulded from an elastic plastics material and is formed as an indefinite length. A ribbed extension 32 is integrally moulded on the top surface of the gasket to engage in channel 31 in lid 217 to thereby engage the gasket to the lid.

Figure 12:
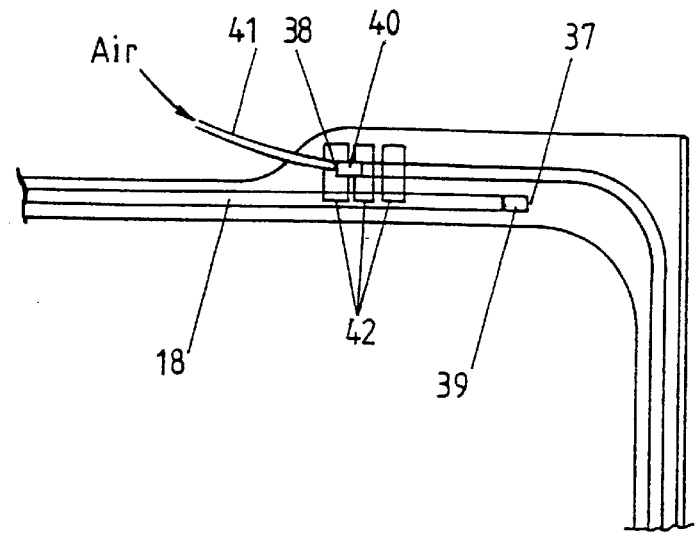
FIG. 12 shows in diagrammatic form one means of juxtapositioning the gasket ends to minimize leakage.

In one embodiment (not shown) a length of gasket material 18 sufficient to trace out periphery of lid 17 is fitted in place and each end coupled to opposite connections on a T connector. The T connector provides air to both ends of gasket 18 to inflate it when required. In a preferred embodiment diagrammatically shown in FIG. 12, a length of gasket material sufficient to allow the ends 37 and 38 to overlap is employed. The channel 31 in the lid also has overlapping parallel ends to support the gasket ends in close parallel relationship. End 37 of gasket 18 includes an air-tight stopper 39 (or is otherwise sealed) while end 38 contains a connector 40 for an air hose 41 which supplies air to inflate the gasket.

Even when the gasket is inflated a small amount of wash fluid will leak between the overlapping ends of the gasket during the wash cycle of the dishwasher. Water egress through this gap must be controlled and for this purpose drainage slots 42 are provided in the wash chamber rim 19 in the region of the exterior gasket end 38 (see also FIG. 13). Any water escaping between the gasket ends is diverted through the slots into a ducting 36. Ducting 36 is a separate plastics moulding attached to the rear surface of chamber 17. Water in ducting 36 is directed back into the bottom of chamber 17 through an aperture (not shown) in the chamber wall located in registration with the sump portion 33 of duct 36.

In order to inflate gasket 18, an air pump is provided which is preferably a solenoid driven diaphragm pump. This pump is mounted inside the rear wall of chamber 3 and couples to air hose 41. The diaphragm pump is energized using a chopped DC supply provided by the dishwasher controller.

In use, when chamber 201 is loaded with dishes and fully retracted within cabinet 203 and the dishwasher powered on, the air pump is activated to inflate gasket 18 to cause lid 217 to seal off the top of chamber 201. The end of the inflation cycle is indicated by the attainment of a desired pressure in gasket 18. The dishwasher controller then initiates the wash cycle. The chamber remains sealed until the drying cycle terminates or until the user withdraws chamber 201 from cabinet 203. During this period the air pump may be cycled on from time to time to ensure adequate sealing pressure is maintained in gasket 18.

Figure 14:
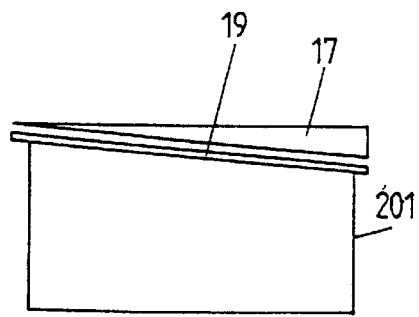
FIG. 14 shows a further method of sealing an open topped wash chamber using a rigid lid.

A further embodiment is shown in FIG. 14 where lid 217 and the rim 19 of wash chamber 201 are provided with complementary inclined edges along the sides thereof. A resilient sealing member is disposed about the periphery of lid 17. When wash chamber 201 is fully retracted in cabinet 203 it seals against lid 17 by virtue of the wedging action that results as a result of the fore-aft inclinations of the lid and chamber rim.

In a further alternative configuration (not shown) a flat rigid lid is provided with a peripheral flexible gasket which cooperates with means on the wash chamber rim so that positive sealing between the lid and wash chamber is achieved by a pure sliding action when the chamber is retracted into the cabinet.

Figure 15:
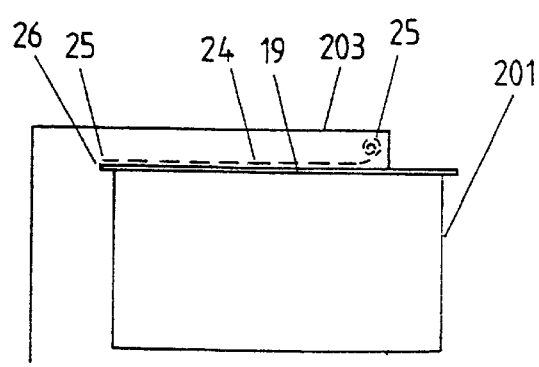
FIG. 15 shows a method of sealing an open topped wash chamber using a flexible closure member.

FIGS. 15 to 17 show alternative embodiments where instead of the use of a rigid lid, a flexible closure is used. In FIG. 15 a curtain type closure 24 is fixed along edge 25 to the rear segment 26 of wash chamber rim 19. Curtain 24 is retractably stored on a spring-loaded roller 27 mounted in the top front of the dishwasher cabinet 203. When wash chamber 201 is withdrawn, curtain 24 is taken up on roller 25 whereas when the wash chamber is retracted, curtain 24 is played off roller 25 to fully cover the open top of the wash chamber 201.

FIG. 16 shows a flexible closure 27 provided with a concertina type configuration and mounted in slides provided in the top sides of the dishwasher cabinet. When the wash chamber 201 is withdrawn from cabinet 203 as shown in FIG. 17, closure 27 folds up due to concertina action whereas when the wash chamber is retracted as shown in FIG. 16 a closure 27 is opened out so as to lie flat along the top of the wash chamber.

A further embodiment is shown in FIGS. 18 and 19. In this embodiment lid 217 is fitted with a inflatable annular member about its outer edge and this member is inflated as shown in FIG. 19 to sealably engage against the side of the interior wall of wash chamber 201. In this case the rear wall of the wash chamber is reduced in height to allow the wash chamber to slide into the cabinet notwithstanding that the lid is fixed in a vertical position lower than the top edge of the chamber walls.

Figure 39:
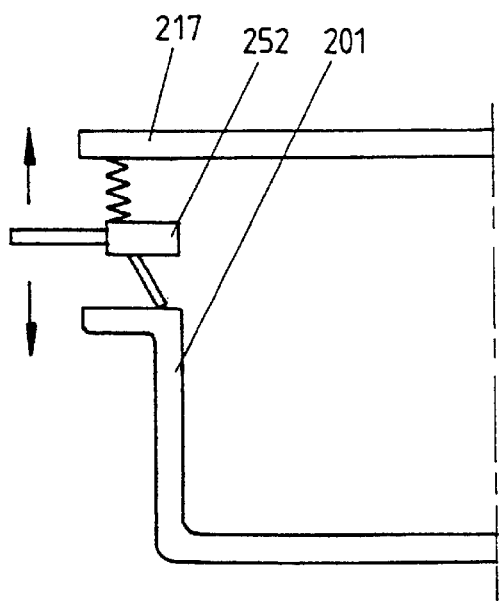
FIG. 39 shows a diagrammatic view of an alternative construction for closing a wash chamber when a fixed lid is used by making use of a moveable seal support carrier.

In addition to using a moving or expanding sealing member onto the top of the wash chamber when it is retracted into the cabinet a separate seal support carrier may be interposed between the periphery of the lid and the sealing member with closure being achieved by lowering the support carrier. This is shown in FIG. 39, where a seal support carrier 252 is attached to lid 217 by an expandable skirt 253. A variety of actuator means giving reciprocal motion can be used to move the seal carrier.

An alternative flexible closure arrangement is shown in FIG. 42. An endless belt 260 mounted on rollers 261 having a width equally to the width of the wash chamber and spacing between rollers approximately equal to the length of the wash chamber covers the top of the chamber when it is fully retracted.

The rollers 261 are mounted at a fixed height in the top of the washer cabinet. The top edge of the rear wall 262 of the chamber is fixed to the belt 260 so that it is rotated and given the same linear motion as the chamber as it is slid closed. A pressure pad 263 may be used to ensure sealing of the belt against the wash chamber and the belt may be stiffened by a series of spaced apart transverse battens.

In the embodiments so far described the closure 217 is essentially fixed in the vertical direction within cabinet 203, whether rigid or flexible. In the following embodiments the closure is moved downwards by various means to sealably close the open top of wash chamber 201.

Figure 20:
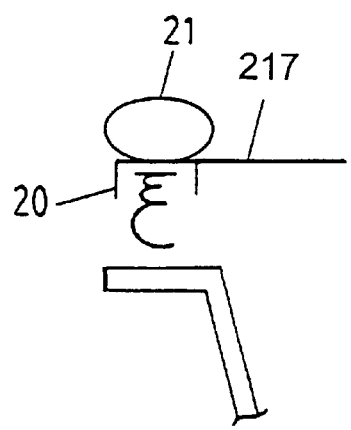
FIGS. 20 and 21 show an alternative method of sealing an open topped wash chamber with a rigid lid.
Figure 21:
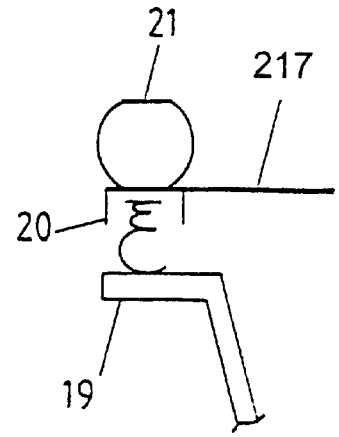

A first such embodiment is shown in FIGS. 20 and 21. Here a peripheral resilient sealing member 20 is disposed on the underside of lid 217 while an inflatable annular member 21 is used to force lid 217 downward in a vertical direction to seal against rim 19 of the wash chamber as shown in FIG. 19.

Figure 22:
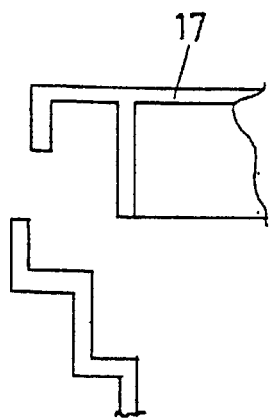
FIGS. 22 and 23 show diagrammatically a further method of sealing an open topped wash chamber with a rigid lid.
Figure 23:
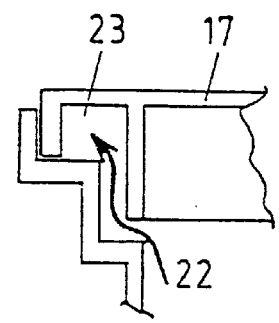

A further embodiment is shown in FIGS. 22 and 23. Here lid 217 is mounted in the top of cabinet 203 so as to be movable in a vertical direction from the position shown in FIG. 22 to the position shown in FIG. 23. Sealing is achieved by providing flange configurations around the edge of the lid and in the top of the wash chamber wall so that when closed, as shown in FIG. 23, an impassable labyrinthic fluid path 22 is formed to thereby effectively seal the wash chamber. The lid and wash chamber flange configuration form a pressure equalization chamber which ensures wash liquid does not escape. This configuration of lid can also be used in a fixed lid mode if the rear wall of the wash chamber is of reduced height to provide clearance for the lid flanges as it is slid into the closed position.

In addition to the labyrinthic path configuration sealing may be assisted by flexible deformable sliding members 264 shown in FIG. 43 and/or by a linear brush member 265 shown in FIG. 44.

Figure 40:
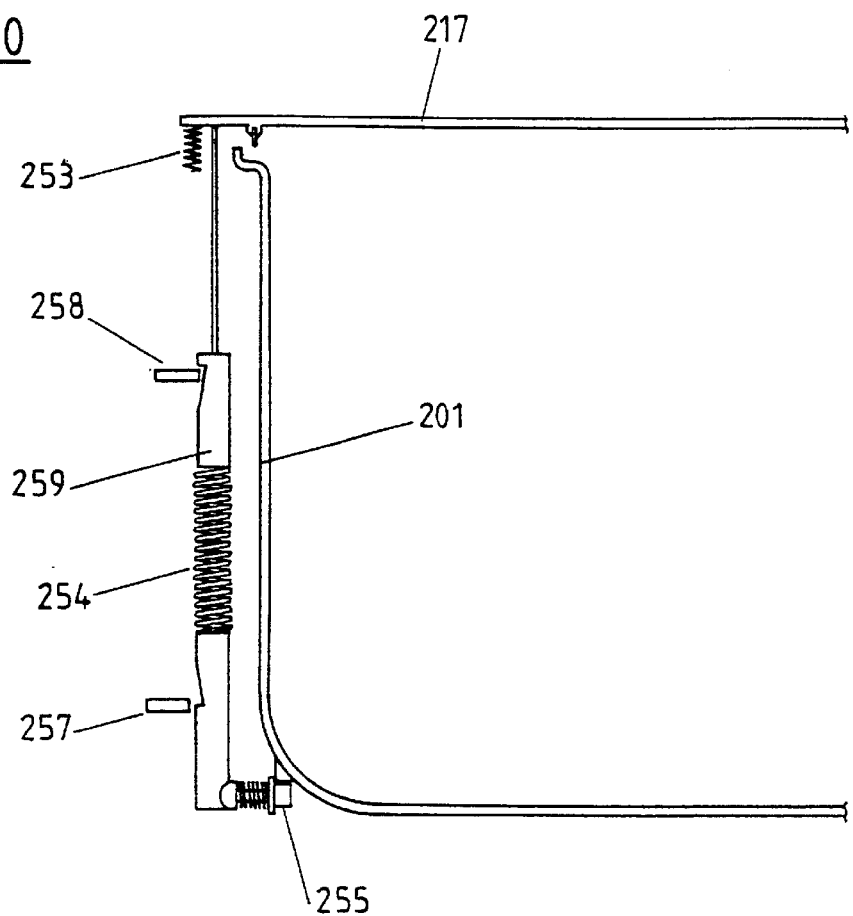
FIG. 40 shows a diagrammatic cross-section of a wash chamber and associated lid which is lowered to close the wash chamber by a stored spring energy system.
Figure 41:
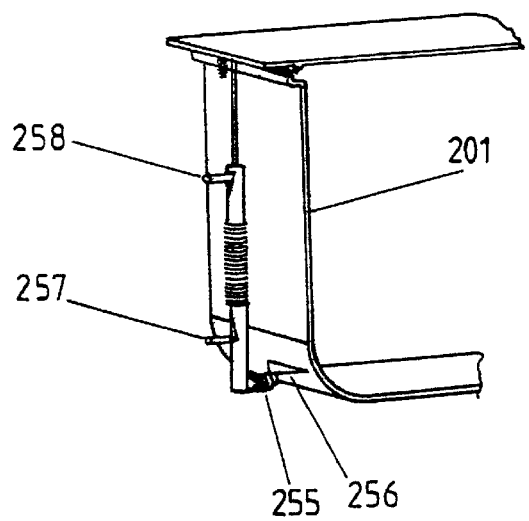
FIG. 41 shows a partial isometric cross-section of the mechanism illustrated in FIG. 40.

An alternative means of raising and lowering a rigid lid is shown in FIG. 40. Compression springs 253 apply a lifting force to lid 217 and maintain it in a normally open position. Tension springs 254 are used to apply a closing force to the lid when the wash chamber is fully retracted into cabinet 201. Tension is applied by a roller 255 attached to one end of the spring travelling over cam or ramp 256 prior to full retraction of the wash chamber. A latch 257 maintains tension in the spring after the roller has passed over cam 256. This is released when it is later desired to raise the lid. A second latch 258 takes the downward force due to the extended spring 254 until the wash chamber is fully retracted whereupon it releases member 259 to allow a closing (lowering force) to be applied to lid 217.

Figure 45:
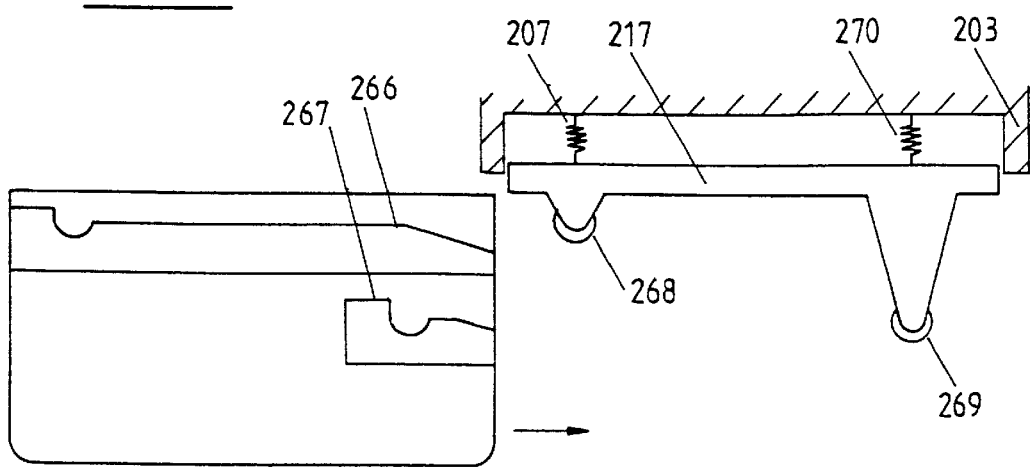
FIGS. 45 to 47 show diagrammatically a wash chamber closure system employing a spring loaded cam and cam follower lid lowering mechanism.
Figure 46:
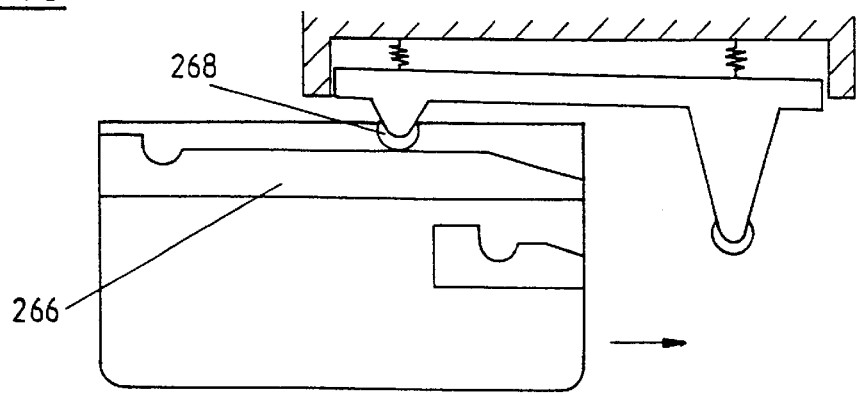
Figure 47:
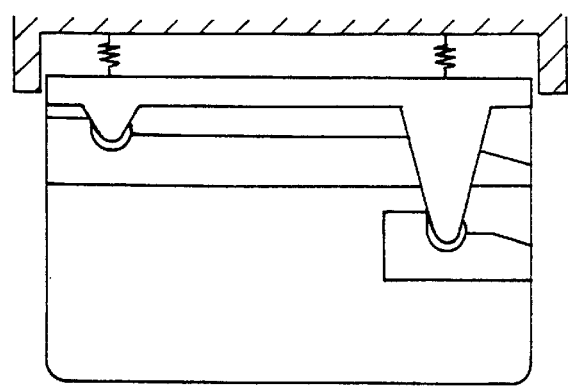

Another mechanism for raising and lowering a rigid lid is shown in FIGS. 45 to 47. A cam and cam follower arrangement is used as follows. Lid 217 is mounted in the top of cabinet 203 on compression springs 270 although restricted against horizontal movement. Wash chamber 201 is provided with cam surfaces 266 and 267 on the outside of each side wall which engage corresponding rollers 268 and 269 as the chamber is moved horizontally to the retracted position. Surface 266 first contacts roller 268 and causes the front of lid 217 to lift as shown in FIG. 46. Similarly surface 267 contacts roller 269 and lifts the rear end of lid 217 as the wash chamber is retracted further. At the end of horizontal travel (FIG. 47) the rollers move down into the semi-circular portions of cam surfaces 266 and 267 under the influence of springs 270 to lower the lid 217 onto the top of the wash chamber and close it.

This cam and cam follower technique can be used with the wedged configuration of lid and wash chamber walls which was shown in FIG. 14. This can assist in achieving an increased sealing force by providing a vertical force component in addition to the horizontal component caused by pushing the wash chamber into the cabinet. A cam and cam follower arrangement can also be used to raise and lower the rear end of the lid in constructions where the front of the lid is pivoted about a transverse horizontal axle at a fixed height in the upper front of the cabinet.

Water Management System

In a dishwasher of the double wash tub configuration shown in FIG. 7 water may be transferred between the upper and lower tubs 202a and 202b to minimise the total volume of water consumed in the wash cycles.

Figure 24:
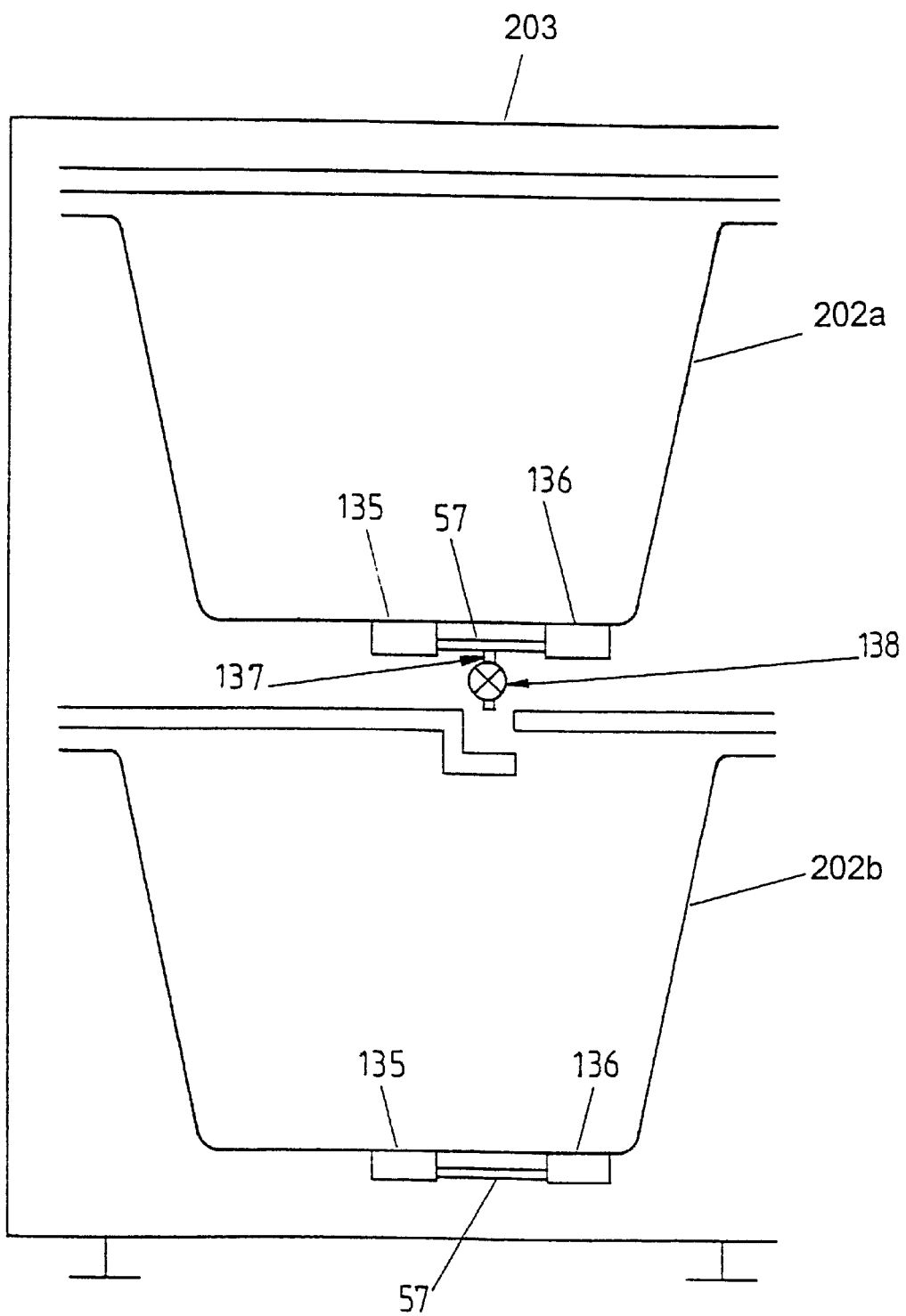
FIG. 24 shows a dual tub dishwasher with provision for inter-tub water transfer.

Referring to FIG. 24, cabinet 203 contains an upper wish tub 202a and a lower wash tub 202b. Each tub has a drain pump 135 fed by a soil pipe 57 from drain sump 136. The soil pipe on wash tub 202a has a branch pipe 137 connected to a valve 138 with the configuration being such that when valve 138 is open water from upper tub 202a can flow through branch pipe 137 into lower wash tub 202b.

A typical wash programme for each wash tub will be: pre-rinse, wash, post-rinse 1, post-rinse 2.

According to this aspect of the invention water used in the upper tub post-rinse cycle 1 is provided to the lower wash tub for its pre-rinse cycle and the water used for the upper tub post-rinse cycle 2 is provided to the lower wash tub for its wash cycle. Thus the dishwasher controller is programmeed to implement this sequence of events by staggering the wash cycles for wash tub 202a and wash tub 202b so that the wash programme for tub 202b is not commenced until the end of post-rinse cycle 1 for the upper tub 202a. At that point, valve 138 is opened to allow the rinse water from tub 202a to flow into tub 202b. The wash programme for tub 202b then commences with a pre-rinse cycle using the water from tub 202a. If the post-rinse cycle 2 time period is the same as the pre-rinse cycle time period, then at the conclusion of post-rinse cycle 2 for tub 202a, the rinse water is discharged into tub 202b at the commencement of the wash cycle for that tub.

Other wash programmes may be constructed using the above concepts to similarly conserve a greater or lesser degree of wash water.

Drain Pump

Figure 25:
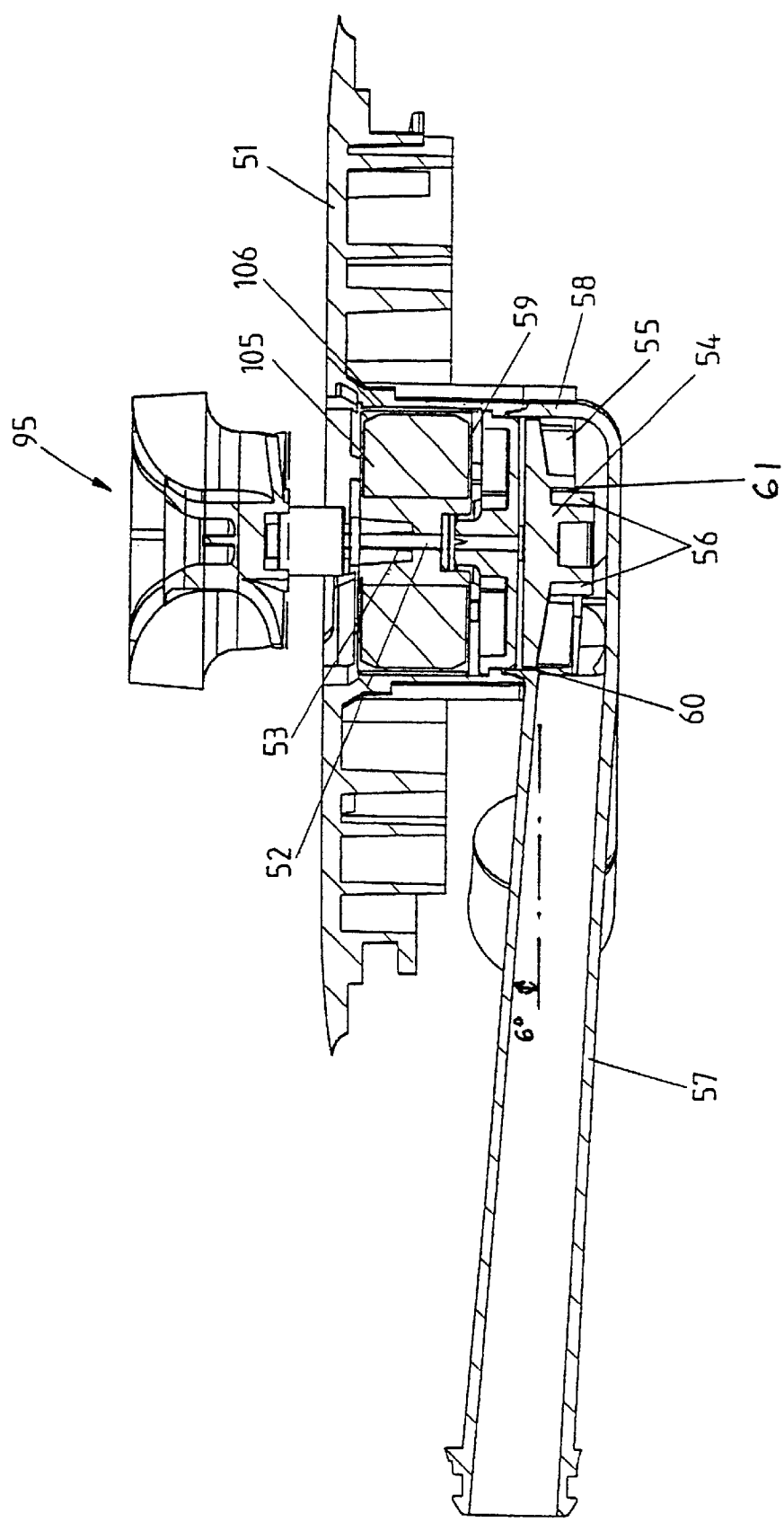
FIG. 25 shows a partial cross-section of a dishwasher drain pump.

Referring to FIG. 25 the present washer (as was the case in WO 93/12706) uses a single motor to drive both the wash pump and drain pump impellers which are mounted at opposite ends of the motor rotor shaft. As in WO 93/12706 the rotor rotates within a well in the washer floor while the motor stator is mounted external to the well under the sliding wash chamber. The wash pump is active when the motor rotates in one direction while the drain pump is active when the motor rotates in the opposite direction.

In FIG. 25 motor rotor 105 is mounted coaxially within well 106 provided in removable central floor section 51 of the wash chamber. Rotor 105 is splined onto a drive shaft 52 which extends out of opposite faces of the rotor. The upper portion of drive shaft 52 carries a wash pump impeller 95 (pump casing and spray system not shown), while the lower section of the drive shaft carries a drain pump impeller 54. The lower portion 58 of well 106 provides a casing within which impeller 54 operates to pump wash water draining into sump 58 into waste pipe 57.

It is necessary to prevent soiled wash water from entering the gap between well 106 and rotor 105 so as to reduce wear on the rotor and to eliminate the possibility of jamming the rotor. In the present invention, a plastics sealing ring 59 is mounted on shaft 52 between the lower face of rotor 105 and the upper face of impeller 54. However without further measures, seal 59 causes air induced into the drain pump to build up to such an extent that liquid priming of the pump may be impeded or prevented.

This problem is overcome in the present invention by ensuring soil pipe 57 leaves the drain pump sump at an inclination of around 6° from the horizontal and by appropriately shaping vanes 55 of the pump impeller. When soil pipe 57 is upwardly inclined, air accumulated up against seal 59 can be bled off so that it does not extend below the level of point 60.

Referring also to FIG. 26 the vanes 55 of impeller 54 are provided with a vertical slot 61 at their roots to provide an annular gap in which trapped air may accumulate when the impeller commences rotating. This allows adequate priming to achieve proper operation of the drain pump.

Heating Element Protection

Figure 27:
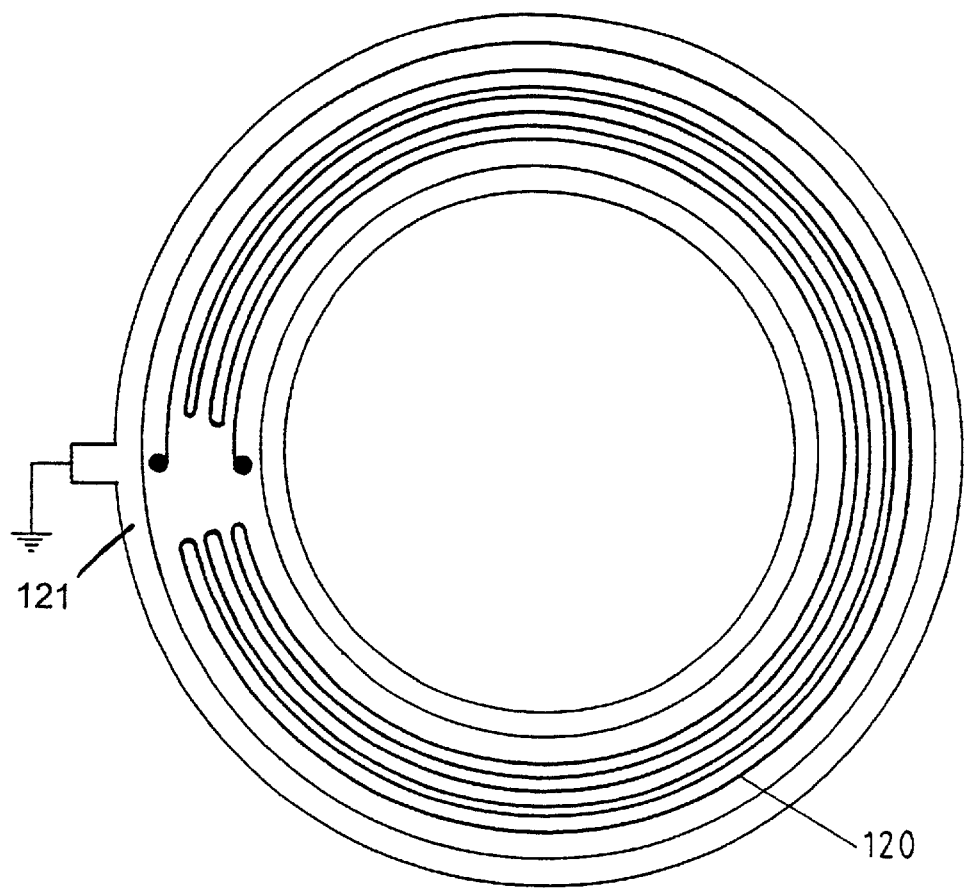
FIG. 27 shows a dishwasher heating element.
Figure 28:
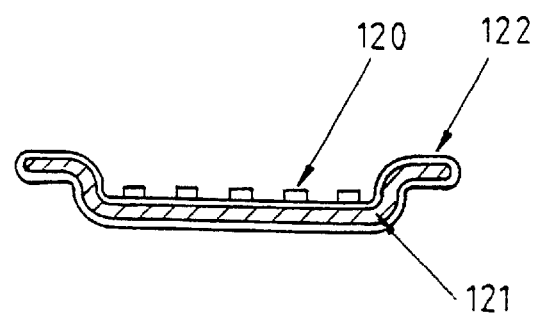
FIG. 28 shows a cross-section along line A—A on FIG. 28.

A heating element for the present dishwasher takes the form of an annular plate which comprises part of the floor of the dishwasher as in WO 93/12706. The heating element shown in FIGS. 27 and 28 consists of a thick film circuit 120 printed on a substrate comprising a steel (or alloy of steel) plate 121 covered with a porcelain enamel coating 122. The enamel forms the dielectric and consists of a ground coat and a cover coat, each of which is separately fired. The thick film resistive circuit 120 consists of a palladium silver composition which is in turn fired on to the enamel coating. Alternatively polymer materials may be coated on the steel plate to form the dielectric. These can be cured and do not need to be fired in a high temperature furnace as is the case with enamel.

If the element runs dry, temperature build up will be such that the thick film track burns and open circuits to cause energy dissipation in the heater element to cease and thereby minimize excessively high temperature build up in the wash tub which may damage plastic supporting components. However, this inherent protection is insufficient to meet some electrical standards and accordingly a sensor circuit which disconnects power from the element is provided. As the steel plate 121 is earthed in use, over temperature in the element system is detected in the present invention by monitoring the leakage current to earth. It will be appreciated that as the enamel dielectric undergoes a local increase in temperature, some current will flow between the thick film 120 and the steel substrate 121.

Figure 29:
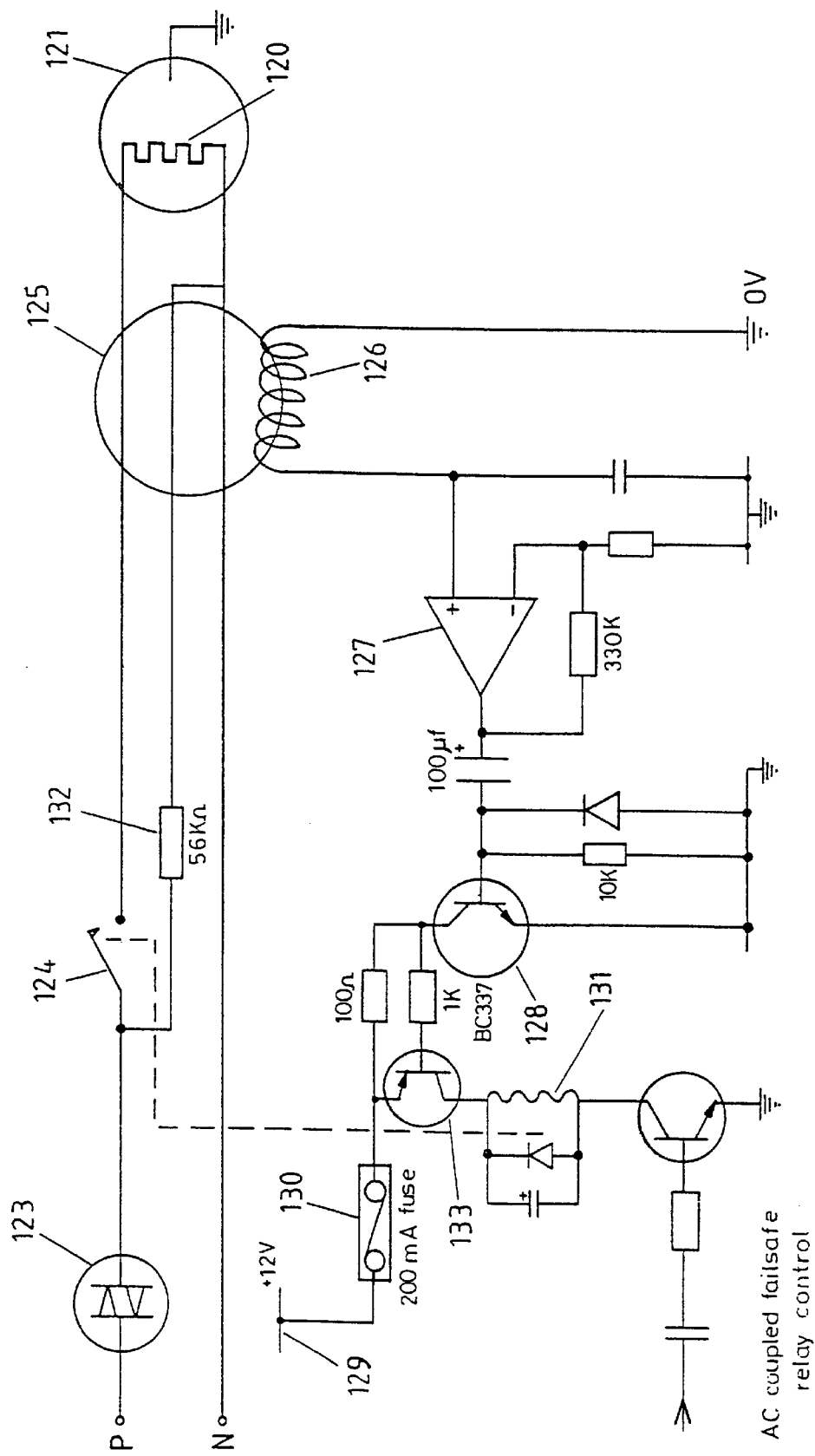
FIG. 29 shows a dishwasher heating element protection circuit.

An earth leakage protection circuit suitable for providing protection for the element system is shown in FIG. 29. Element 120 is energised from the AC mains supply (phase P, neutral N) through series switching devices comprising a triac 123 and a relay 124. A differential current transformer 125 is coupled to the AC supply to element 120 and produces a voltage in winding 126 if an out of balance current exists in the supply phase and neutral conductors. This will occur if there is any leakage of the heater supply to the earthed element plate 121.

An operational amplifier 127 monitors the voltage across transformer winding 126 and when the earth leakage current exceeds a predetermined maximum, say 20 mA, the output of operational amplifier 127 switches npn transistor 128 into saturation mode. This allows excess current to flow from the 12 volt DC rail supply 129 through 200 mA fuse 130, pnp transistor 133, relay coil 131 to earth. The fuse blows and removes the supply of current to the relay coil 131, thus opening relay switch 124 to disconnect supply from element 120.

The present invention also provides a failsafe circuit for the earth leakage triggering circuit described so far. This ensures that element 120 cannot be turned on in the event that the circuit described develops a fault.

Accordingly a resistor 132 supplies a small AC "bias" current (which may be around 5 mA) through current transformer 125. This produces a small out of balance voltage across winding 126 which produces a positive voltage offset at the output of operational amplifier 127 which in turn causes enough current to flow through transistor 128 to bias on transistor 133, thereby allowing enough current to flow through relay winding 131 and hold relay switch 124 on. The current in transformer winding 126 is insufficient to cause enough current to flow through fuse 130 and transistor 128 to cause the fuse to blow. With this arrangement, if any part of the protection circuit fails, the current flow through resistor 132 ceases, the 'bias' offset in winding is no longer detected and transistor 133 is turned off to de-energise the relay causing switch 124 to open and remain open while this state exists.

Detergent Dispenser

A detergent dispenser for use in the present dishwasher is illustrated in FIGS. 30 to 37. The detergent dispenser fits behind the interior front wall 4 of the wash chamber and is accommodated within the thickness of front panel 202 (see FIG. 1).

Figure 32:
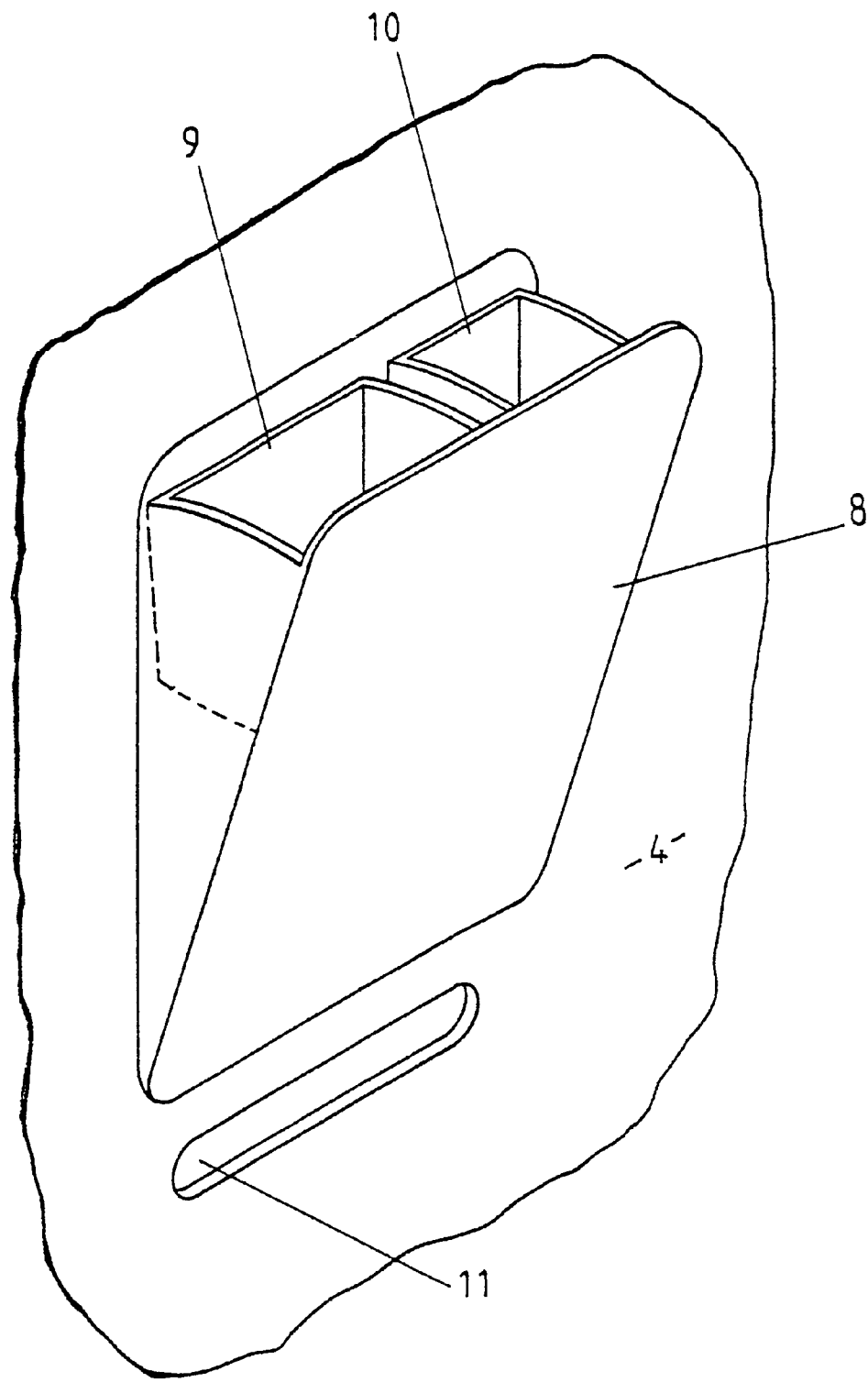
FIG. 32 shows a pictorial view of the detergent dispenser open for filling.

Referring to FIGS. 30 to 32, the detergent dispenser is formed by providing a moulded receptacle 5 within a substantially rectangular aperture 6 within wash chamber wall 4. A pivoted or hinged door 8, which closes off receptacle 5, provides a sub-frame to which detergent containers 9 and 10 are mounted. A vent 11 provides a communication between receptacle 5 and the wash chamber even when door 8 is closed. Vent 11 allows detergent to enter the wash chamber in a manner described below. Two water outlet nozzles 12A and 12B (only one nozzle is shown in FIGS. 30 and 31) are positioned in the top of receptacle 5 and located so as to discharge water into detergent containers 9 and 10 respectively.

Figure 33:
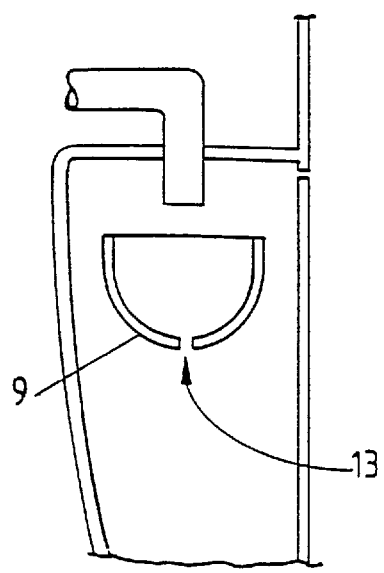
FIG. 33 shows a partial cross-section of the detergent dispenser.
Figure 34:
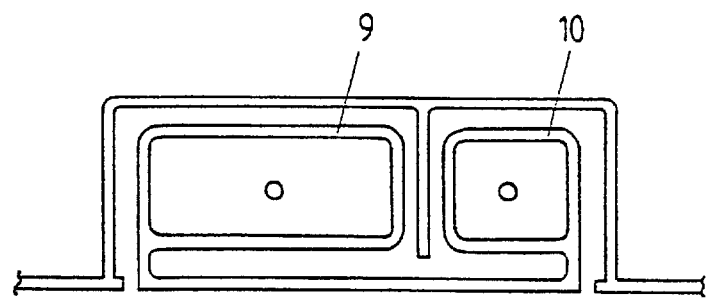
FIG. 34 shows a plan view of the detergent dispenser closed.

Operation of the detergent dispenser is as follows. Detergent is loaded into the detergent containers 9 and 10 as shown in FIG. 30. Door 8 is opened for this purpose. It is then closed and wash chamber 1, loaded with dishes, is retracted into cabinet 3. At the appropriate time in the wash cycle the dishwasher controller opens a valve to allow water to discharge from nozzle 12B. This nozzle discharges into the smaller detergent container 10 in a rinse cycle prior to the main wash cycle. However the action of the detergent dispenser will be explained with reference to nozzle 12A discharging into larger container 9. The discharge causes water to mix with the detergent in container 9 and flush the water/detergent mixture out of the top of the container 9 to spill into receptacle 5. The detergent containers are provided with a small bottom aperture 13 (as shown in FIG. 33) for drainage. The aperture is sufficiently small to prevent discharge of dry detergent. The water/detergent mix then enters the wash chamber through vent 11.

Figure 3:
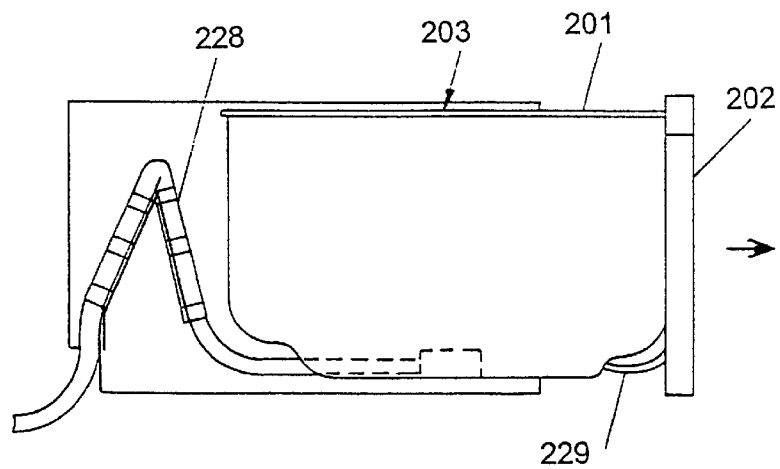

Receptacle 5 may be mounted in wash chamber wall 4 using clamps tightened by screws which serve to compress an O-ring to seal the dispenser flange to wall 4 of the wash chamber in a known way. The provision of water outlets in the moving wash system means that a water supply hose 229 must flexibly extend between the cabinet and the wash chamber into front panel 202. This is arranged together with a drain hose and electrical wiring to form a hose wiring bundle 228 as shown in FIG. 3.

The present dishwasher dispenser does not impinge on wash chamber volume, does not rely on wash water to dispense detergent and has no moving parts that may be fouled during the dispensing cycle. While described for use in a dishwasher of the sliding drawer type, it may be used in dishwashers of conventional design having a front opening door to the wash chamber.

Figure 35:
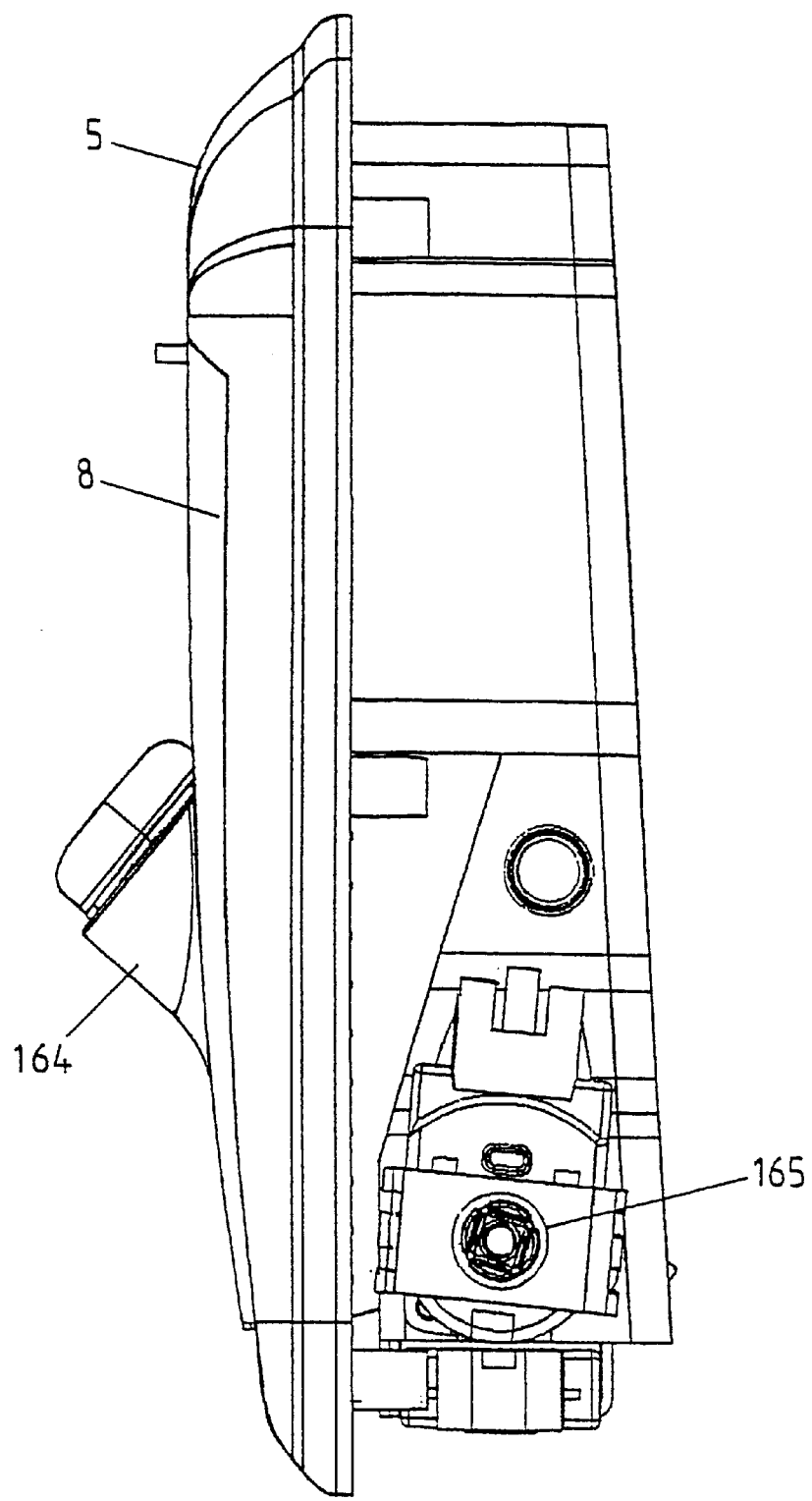
FIG. 35 is a partial view of the detergent dispenser showing how it is fixed to the dishwasher wall.
Figure 36:
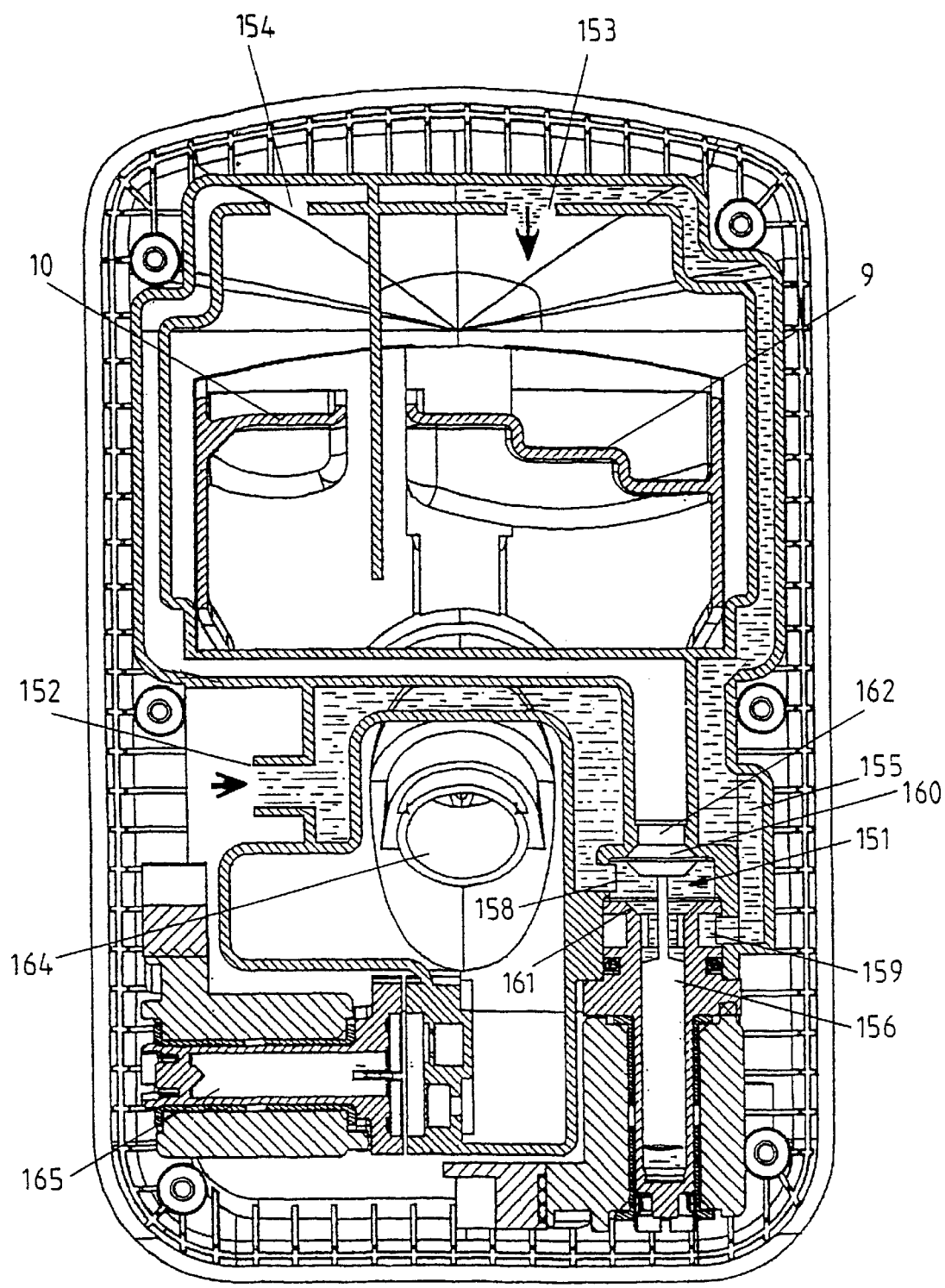
FIG. 36 shows a sectional view of a dishwasher detergent dispenser indicating water paths through the dispenser.

In the preferred form the detergent dispenser is moulded from plastics in two parts, namely receptacle 5 and door 8 as shown in FIGS. 35 and 36. To reduce components the water conduits and valve casings are integrally moulded in receptacle 5. This can be seen in FIG. 36. As previously mentioned, water must be controllably released in the detergent dispenser through either of nozzles 12A or 12B. A two-way shuttle valve 151 is used to divert water entering the dispenser water inlet 152 between a respective outlet 153 or 154. Outlet 154 discharges into the pre-rinse detergent container while outlet 153 delivers water into the main wash detergent container. The water paths and the valve casing are all provided within the detergent dispenser moulding.

Figure 37:
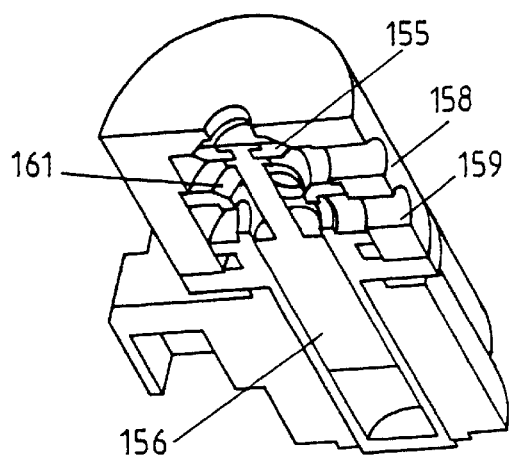
FIG. 37 shows a pictorial sectional view of a two-way shuttle valve for use with a dishwasher detergent dispenser.

Two-way valve 151 which is shown in more detail in FIG. 37, comprises a seal 155 reciprocated between one of two positions by a solenoid armature 156 within a solenoid coil (not shown).

The dishwasher controller at appropriate points in the wash cycle opens a valve to supply water to detergent dispenser inlet 152. This water flows through passageway 157 to port 158 of the two-way valve 151. If valve seal 155 is in the position shown, water entering port 158 is able to exit through port 159 from whence it proceeds through passageway 160 which discharges through outlet 153. The water so discharged then enters detergent container to function as previously described.

If solenoid armature 156 is retracted, valve seal 155 abuts against valve seat 161 to prevent water entering inlet port 158 from exiting through outlet port 159. However, the water entering the valve body may exit through outlet port 162. It then enters into water passageway 163 to be subsequently discharged at outlet 154. This is the discharge point for the flushing of pre-rinse detergent container 10.

The detergent dispenser moulding also incorporates a rinse aid reservoir 164 and the rinse aid liquid is dispensed into the wash chamber in a metered volume by a pump 165. This pump is preferably a solenoid operated diaphragm pump which is supplied with pulsed DC and the volume of rinse aid dispensed is directly proportional to the period for which pump 165 is activated.

A charge of rinse aid is admitted into the wash chamber dining the main wash cycle as follows. A solenoid driven diaphragm pump connected on its suction side to a refillable rinse aid reservoir is energised with chopped direct current for a predetermined time. The time is pre-stored in the dishwasher controller and is set to deliver an optimum volume of rinse aid for normal washes.

What is claimed is:

1. A dishwasher having a wash programme consisting of pre-rinse, wash, first post rinse and second post rinse cycles comprising:

first and second wash chambers, means for transferring wash liquid from the first wash chamber to the second wash chamber, and a controller which implements said wash programme and which controls the operation of said transference means, said controller:

(a) delaying the commencement of the wash programme for said second wash chamber until after the end of the first post rinse cycle in the wash programme for the first wash chamber, (b) causing said transference means to transfer the rinse water from the first post rinse cycle of the first wash chamber from the first wash chamber to the second wash chamber, (c) initiating the pre-rinse cycle for the second wash chamber using the first post rinse water from the first wash chamber, (d) causing said transference means to transfer the rinse water from the second post rinse cycle of the first wash chamber from the first wash chamber to the second wash chamber, and (e) initiating the wash cycle for the second wash chamber using the second post rinse water from the first wash chamber.

* * * * *